J. A. BETHEA.
AUTOMOBILE TIRE.
APPLICATION FILED JAN. 11, 1913.
1,066,368.
Patented July 1, 1913.
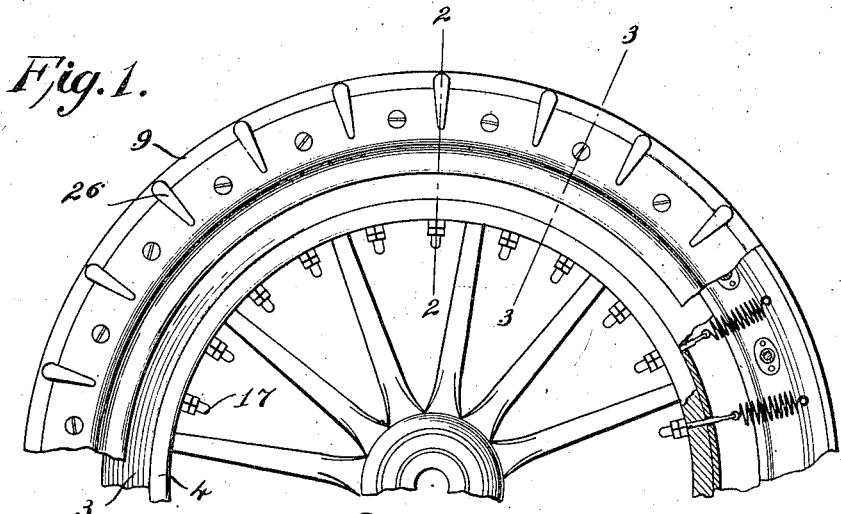
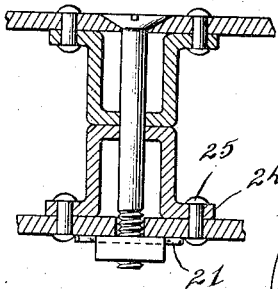
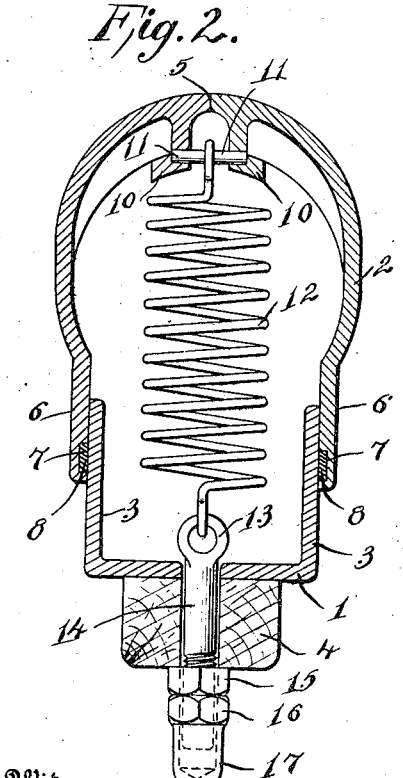
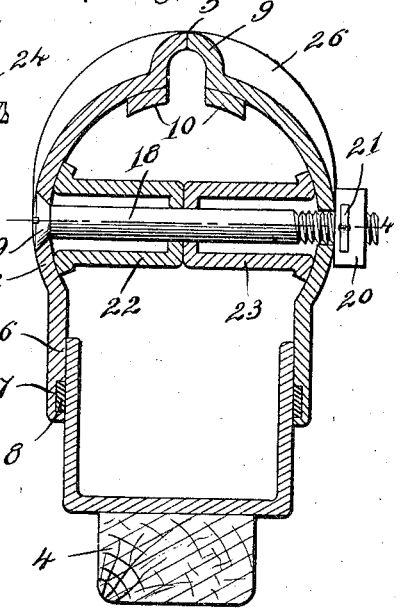
Witnesses
P. M. Hunt.
P. M. Smith.
Inventor
J. A. Bethea
By Victor J. Evans.
Attorney

UNITED STATES PATENT OFFICE.

JOSEPH A. BETHEA, OF BREWTON, ALABAMA.

AUTOMOBILE-TIRE.

1,066,368.

Specification of Letters Patent. Patented July 1, 1913.

Application filed January 11, 1913. Serial No. 741,523.

*To all whom it may concern:*

Be it known that I, JOSEPH A. BETHEA, a citizen of the United States, residing at Brewton, in the county of Escambia and State of Alabama, have invented new and useful Improvements in Automobile-Tires, of which the following is a specification.

This invention relates to tires for automobiles, motor trucks, and self-propelled vehicles, the object in view being to provide an all metal tire as a substitute for the ordinary pneumatic tire now in common use, which will practically resist puncture and do away with all of the ordinary tire troubles.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a portion of a wheel rim and tire, partly in section. Fig. 2 is a cross section through the same on the line 2—2 of Fig. 1. Fig. 3 is a cross section on the line 3—3 of Fig. 1. Fig. 4 is a detail cross section on the line 4—4 of Fig. 3.

The tire contemplated in this invention is composed wholly of metal, preferably steel, and embodies an inner section or rim 1, and an outer or tread section or tire proper 2. The rim 1 is provided at its opposite sides with parallel flanges 3 extending circumferentially around the same, the rim as a whole being secured in any convenient manner to the wooden or other felly 4 of the wheel.

The tread member or tire 2 is composed of two sections, each the counter part of the other, and primarily divided on the line 5. The main body portion of the section 2 is substantially round or cylindrical in cross section, and is extended inwardly in the form of parallel flanges 6 which embrace and work against the outer faces of the flanges 3 of the rim, the flanges 6 being provided with annular grooves or seats 7, in which are placed packing rings 8, which, by working in contact with the outer faces of the flanges 3, exclude all dirt, dust, water and other foreign matter.

At the extreme outer or tread portion of the member 2, a hollow circumferentially projecting anti-skid rib 9 is provided, and just within said rib, reinforcing rings or strips 10 are secured permanently to the inner face of the section 2, adapting the same to be bored to receive pins 11, which extend transversely of the tread portion of the tire and have secured thereto the outer extremities of a circular series of coiled contractile springs 12, the inner extremities of which are attached to the eyes 13 of a circular series of eye bolts 14. These eye bolts pass through the rim 1, and the felly 4, and are secured by means of nuts 15. Jam nuts 16 are threaded on the bolts 14 outside of the nuts 15, and are provided with hoods or nipples 17 to cover and protect the threads of the eye bolts.

Arranged at suitable intervals throughout the body of the tire are tie bolts 18 which pass through openings in the opposite sections of the tire, each bolt being provided at one end with a head 19, and at the opposite end with a nut 20 threaded thereon and locked in place by means of a split cotter pin 21.

Encircling each bolt 18 is a sectional spacer, comprising the two members 22 and 23, said members having their inner ends arranged in abutting relation, as illustrated in Figs. 3 and 4, and provided at their outer ends with flanges 24 extending in a circumferential direction and riveted or otherwise fastened to the tire sections, as shown at 25. These spacers 22 and 23 hold the sections of the tire at the proper distance apart, so that the flanges 6 will ride in close contact with the outer surfaces of the flanges 3, thereby keeping the interior of the tire clean.

In addition to the hollow circumferential anti-skid rib 9, the tread surface of the tire is also provided with hollow transverse ribs or corrugations 26 which enable the tire to obtain the necessary hold or traction upon the surface being traveled upon.

The tie bolts 18 enable the opposite sections of the tread member 2 to be uncoupled from each other, for the purpose of applying the same to or detaching the same from the rim 3.

Any desired number of springs 24 may be employed, and also any desired number of tie bolts 18. Ordinarily, about twenty-four springs, and half that number of tie bolts will be employed, but this is a matter to be left to the discretion of the manufacturer, and to be governed by the load which the wheel is designed to support and carry.

What is claimed is:

The combination of a rim having parallel circumferential flanges, of a hollow steel tire having parallel inwardly extending flanges embracing and bearing against the rim flanges, coiled springs attached at their opposite ends to the tire and rim, the tire being centrally and longitudinally divided into twin sections and provided with a central circumferentially projecting and internally channeled anti-skid rib, and pins extending across said channeled rib and connecting the tire sections and having the springs attached thereto.

In testimony whereof I affix my signature in presence of two witnesses.

JOSEPH A. BETHEA.

Witnesses:
WALTER G. JOHNSON,
JOHN R. CRAKER.

Copies of this patent may be obtained for five cents each, by addressing the "Commissioner of Patents, Washington, D. C."